March 14, 1944. L. HERMANI 2,344,460
MACHINE FOR ASSEMBLING METAL CONTAINERS
Filed Sept. 28, 1940 11 Sheets-Sheet 1

Fig. 1.

INVENTOR
LOUIS HERMANI
BY Rule & Hoge
ATTORNEYS

March 14, 1944.  L. HERMANI  2,344,460
MACHINE FOR ASSEMBLING METAL CONTAINERS
Filed Sept. 28, 1940  11 Sheets-Sheet 2

Fig. 2.

INVENTOR
LOUIS HERMANI
BY Rule & Hoge
ATTORNEYS

March 14, 1944.  L. HERMANI  2,344,460

MACHINE FOR ASSEMBLING METAL CONTAINERS

Filed Sept. 28, 1940  11 Sheets-Sheet 4

Fig.4.

INVENTOR
LOUIS HERMANI
BY
ATTORNEYS

March 14, 1944.  L. HERMANI  2,344,460
MACHINE FOR ASSEMBLING METAL CONTAINERS
Filed Sept. 28, 1940  11 Sheets-Sheet 9

INVENTOR
LOUIS HERMANI
BY
ATTORNEYS

March 14, 1944.    L. HERMANI    2,344,460
MACHINE FOR ASSEMBLING METAL CONTAINERS
Filed Sept. 28, 1940    11 Sheets-Sheet 11

INVENTOR
LOUIS HERMANI
BY Rule & Hoge
ATTORNEYS

Patented Mar. 14, 1944

2,344,460

UNITED STATES PATENT OFFICE 2,344,460

MACHINE FOR ASSEMBLING METAL CONTAINERS

Louis Hermani, Baltimore, Md., assignor to Owens-Illinois Can Company, a corporation of Delaware Application September 28, 1940, Serial No. 358,865

8 Claims. (Cl. 113—1)

The present invention relates to improvements in machines for assembling metal containers and more particularly is concerned with the assembly of containers of the type disclosed in Nyden Patent #2,197,481 issued April 16, 1940, wherein the hinge carrying portions of the body and cover are telescoped one within the other in such fashion as to interengage the hinge members.

An object of my invention is the provision of a completely automatic machine by means of which the container parts are formed and delivered to an assembly station, assembled at said station and immediately thereafter closed preparatory to packing in cartons or the like for shipment.

Another object of my invention is the provision of an automatic continuously operating machine of the above character in which the delivery of one part to the assembly station is dependent upon delivery of the other part to said station. Thus, for example, should a bottom portion or body part fail to reach the assembly position at the proper and predetermined time, the mechanism for delivering a cover or closure to the assembly station would not operate.

A further object of my invention is the provision of novel means for controlling the delivery of container covers or closures to the assembly station. To this end the covers are carried along a horizontal conveyor and at a predetermined point are discharged therefrom into a vertical guideway by a jet of air under pressure, the latter being interrupted at such times as the guideway has been substantially filled with the cover portions.

It is also an object of my invention to provide positive means for closing the containers after the hinge members have been interengaged at the assembly station. This closing means also is of such form as to "size" the finally assembled container by a squeezing operation which insures uniform exterior dimensions and contour of all of the complete containers.

Other objects will be in part apparent and in part pointed out hereinafter.

Figure 1:
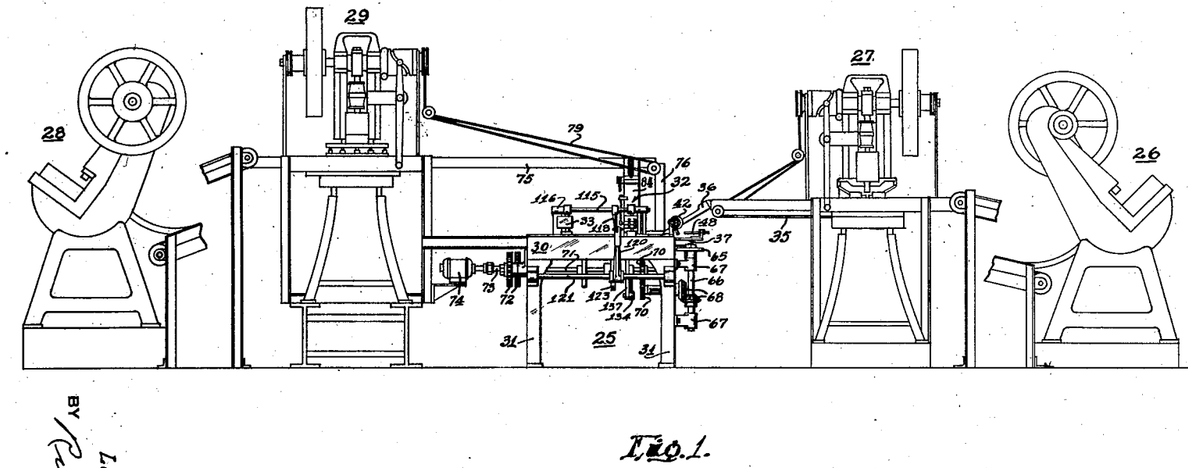
Fig. 1 is a side elevational view of the entire machine embodying my invention.
Figure 2:
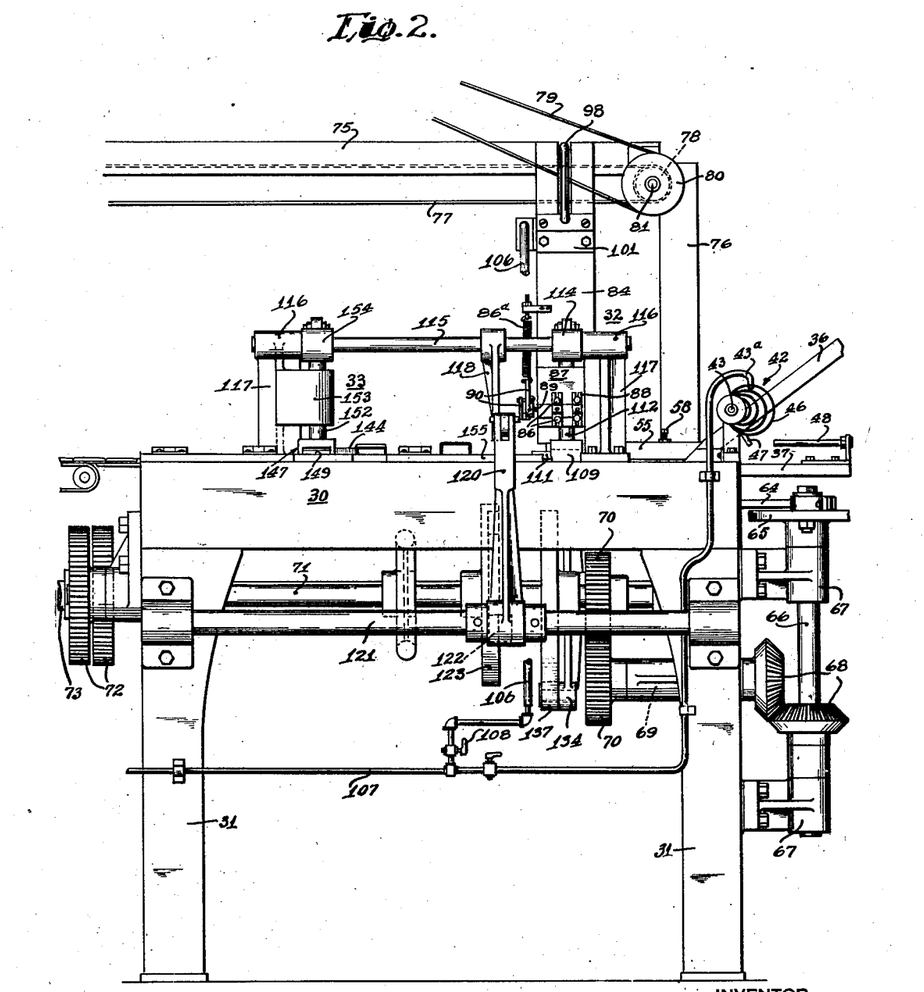
Fig. 2 is a detail side elevational view of the parts assembling apparatus.
Figure 3:
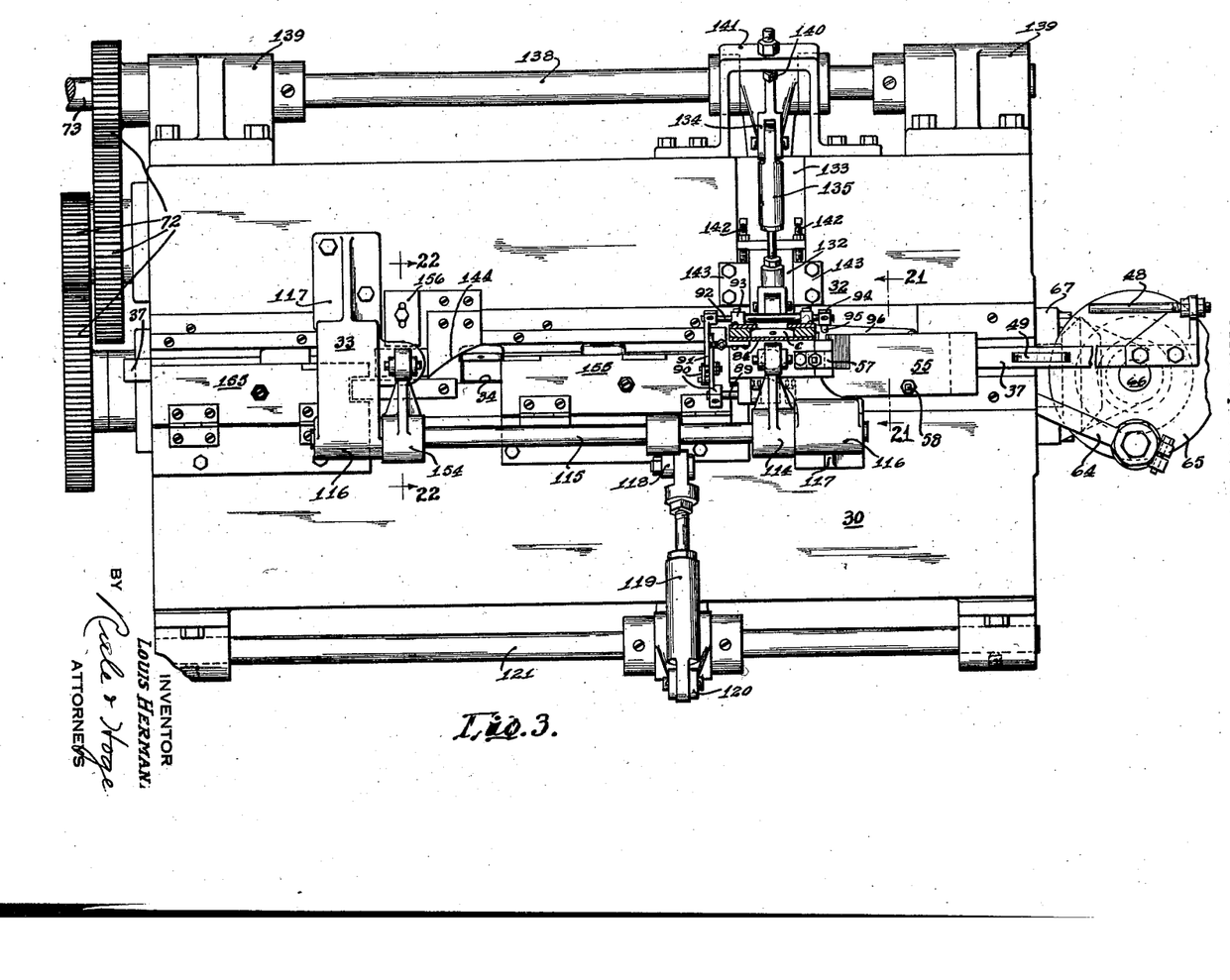
Fig. 3 is a partial plan view thereof.
Figure 4:
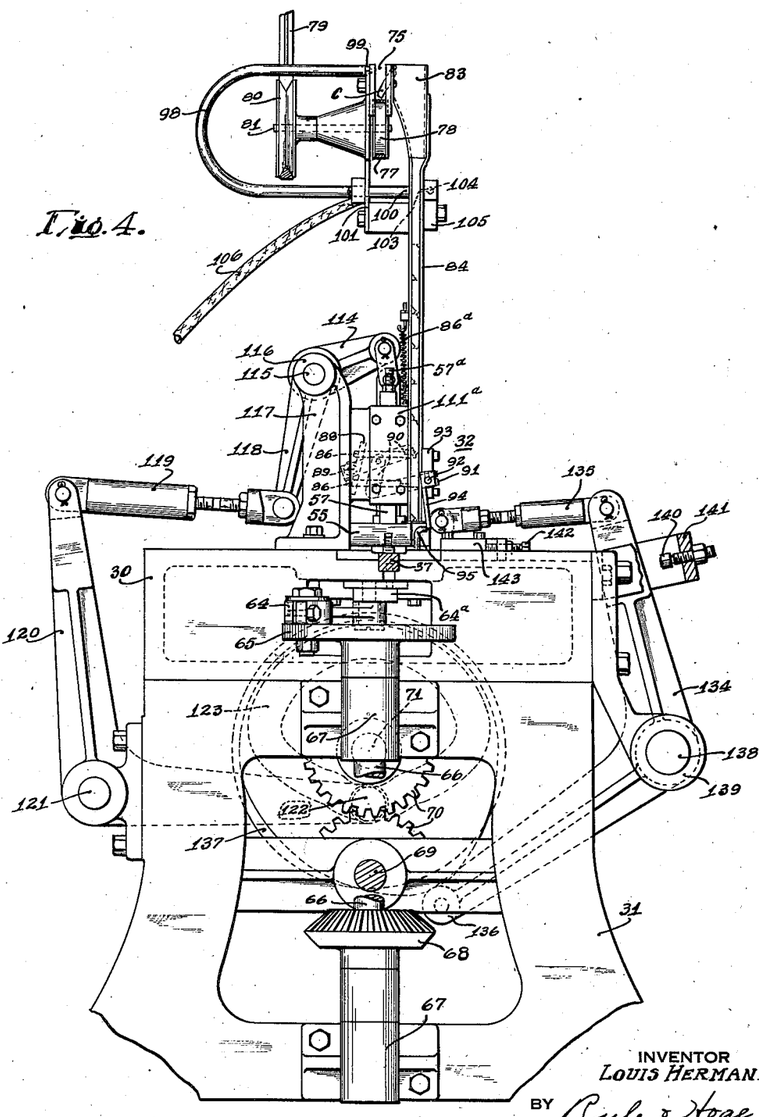
Fig. 4 is an end elevational view taken from the righthand side of Fig. 3.

Briefly, my invention (Fig. 1) includes an assembling machine 25 to which the cover and body portions of said metal containers are delivered in proper timed relation. The body or bottom portions are produced by a punch press 26 and transferred to a press 27 which notches and slots certain of the side walls, such notches and slots constituting part of hinge means which finally connects the body and cover parts. From the notching press 27 the body portions are transferred to the assembling machine 25. At another side of the assembling machine there is arranged a punch press 28 which initially forms the cover or closure blank. A press 29 to which these covers or closures are transferred, produces bosses or indentations in certain of the walls, such indentations or bosses being adapted for cooperation with the slots and notches in the body portions in forming a hinge. These cover portions are then transferred to the assembling machine 25 and by automatic means are in part telescoped over corresponding body portions in a fashion to interengage the hinge members. A closure of this type is disclosed in the above identified Nyden Patent #2,197,481.

The assembling machine 25 receives the body and cover portions and quickly assembles them in open position. Immediately thereafter the open assembled containers are automatically delivered to a closing device which cams the cover downwardly over the body portion and simultaneously therewith "sizes" the containers. This latter operation "sizing," involves squeezing inwardly any portions of the cover which may project outward abnormally and thereby insures uniformity of exterior dimensions and contour.

The assembling machine (Figs. 1, 2, 3, and 4) comprises a horizontal table 30 supported upon legs 31. Near one end of the table an assembling unit 32 is mounted and in proximity to this unit there is arranged the aforementioned container closing and "sizing" device 33.

Figures 5, 6, 7:
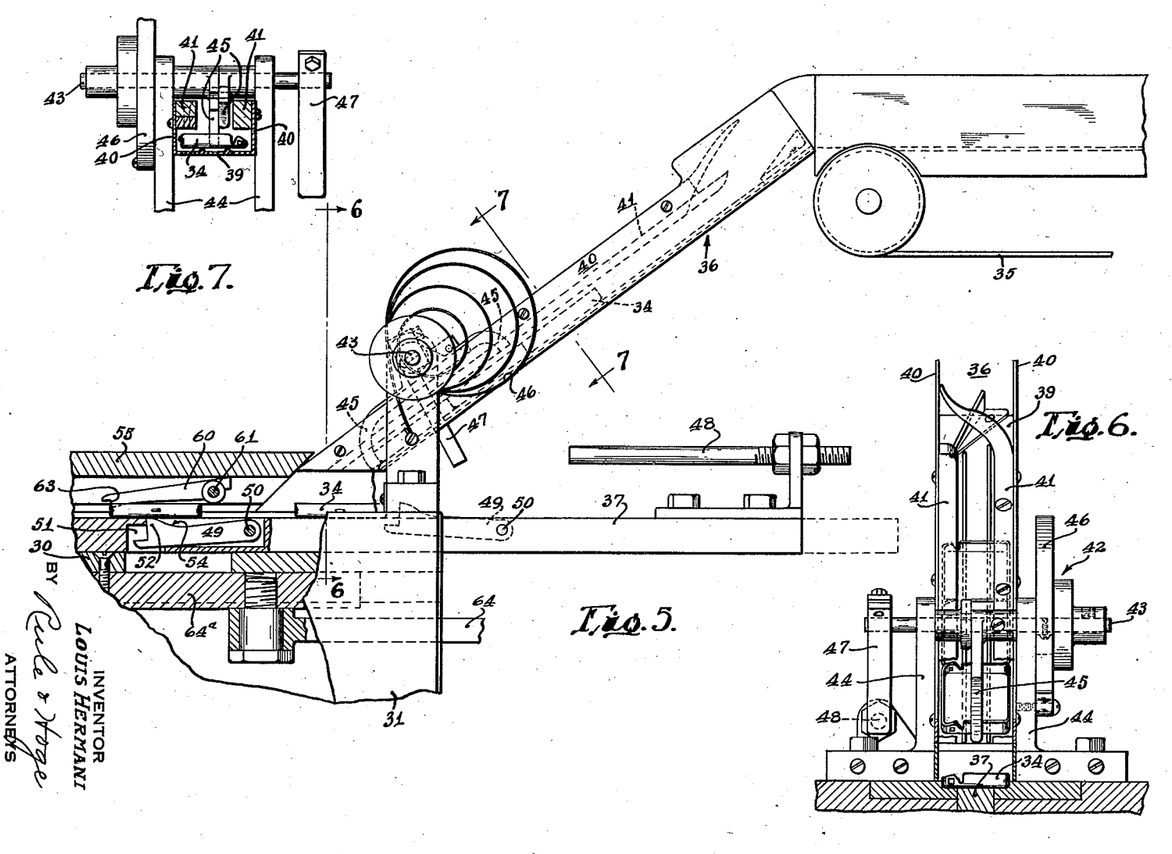
Fig. 5 is a fragmentary side elevational view with parts in section of the bottom or body part feeding mechanism.
Fig. 6 is a sectional elevational view taken substantially along the line 6—6 of Fig. 5.
Fig. 7 is a sectional elevational view taken along the line 7—7 of Fig. 5.
Figure 8:
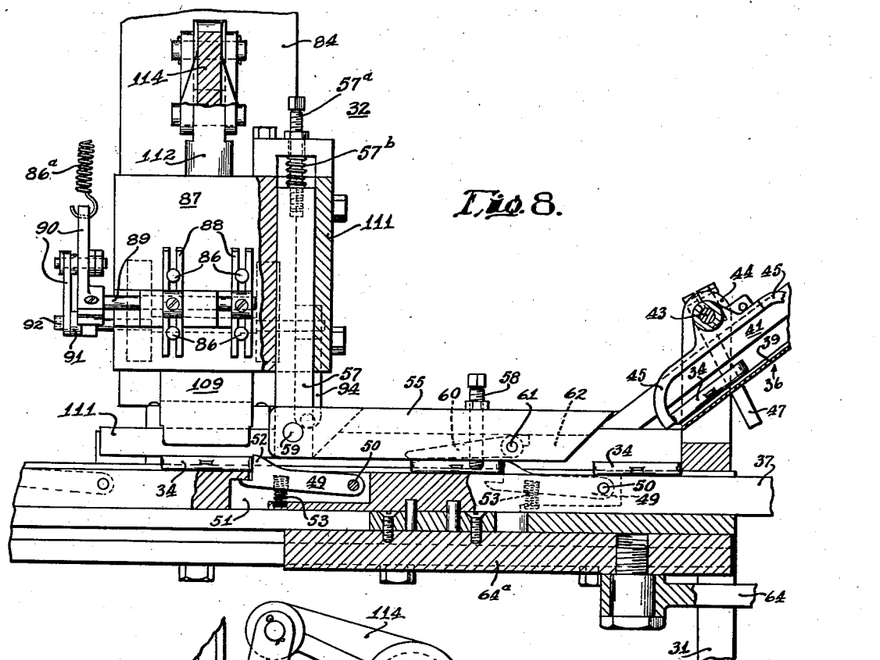
Fig. 8 is a sectional elevational view showing the manner in which the bottom or body parts are delivered to the assembly station.

The body portions 34 of the containers are transferred to the assembling unit 32 from the punch press 27 at regular time intervals by means of a conveyor 35, (Fig. 5) inclined chute 36 and a horizontal reciprocating feed bar 37, the latter being mounted in an upwardly facing channel 38 which is provided in the upper face of the table 30. The conveyor 35 is disposed horizontally and has its delivery end positioned in close proximity to the upper receiving end of the chute 36, the latter including a bottom 39 (Fig. 6) a pair of side walls 40 and a pair of guide bars 41 which are attached to the inner faces of the side walls 40. These guide bars are spaced from the bottom 39 a distance approximately equal to the height of the body portions of the metal containers and together with the bottom and side walls, provide in effect a closed passageway through which the body portions travel to the feed bar 37. Near the lower end of the chute is a feed control device 42 which operates to release the body portions 34 from the chute one at a time for delivery by gravity to the feed bar 37.

This feed control device comprises a rock shaft 43 (Figs. 5, 6 and 7) mounted above the lower end of the chute 36 in bearings at the upper end of a pair of brackets 44. Opposed hook-like fingers 45 are secured to the rock shaft and project into the chute. Rocking of the shaft 43 operates to project these fingers one at a time into the path of travel of the container body portions 34 in such fashion that they are released one at a time and discharged by gravity from the chute onto one end of the feed bar. A stream of air under pressure is constantly directed downwardly into the chute by an air nozzle 43ª to insure discharge of the container parts. Normally the lowermost finger 45 is yieldingly held substantially in contact with the bottom of the chute and in advance of a group of container bodies supported therein, by means of a coil spring 46, one end of which is attached to one of the brackets 44 while its other end is secured to the rock shaft 43. Rocking of the shaft at regular time intervals in opposition to the spring to release single container bodies, is obtained by means of an arm 47 which depends from one end of the rock shaft 43 into the path of travel of a push rod 48, the latter being secured to the upper side of the reciprocating feed bar 37. It is clear from the foregoing that movement of the feed bar 37 to the left in Fig. 5, causes engagement between the push bar 48 and arm 47, resulting in lifting of the lowermost finger 45 to a position which releases the lower container body 34. Simultaneously with such upward movement of the lower finger 45, the upper corresponding finger is moved downwardly to prevent the discharge of more than one of the container bodies.

The horizontal feed bar 37 (Figs. 3, 5, 8, 10 and 11) which carries the container bodies one at a time from the chute 36 to the assembling unit 32, includes a longitudinal series of uniformly spaced pusher fingers 49. Each of these pusher fingers is pivoted at its rear end upon a horizontal hinge pin 50 and is positioned almost in its entirety within a recess 51 formed in the feed bar 37. The free forward end of the finger is provided with an upstanding nose portion 52 or abutment which is adapted for engagement with an end wall of the body portions of the containers preparatory to moving them along the table to and beyond the assembling unit 32. A coil spring 53 which is interposed between the bottom of the finger 49 and the lower wall of the recess 51, normally yieldingly positions the nose portions 52 for engagement with the body portion of the containers. The upper side of the finger 49 is provided with a curved face 54 in proximity to the nose 52, such face being adapted for sliding engagement with the lower side of the container body portions during each rearward stroke of the feed bar.

During advance of the container bodies 34 along the channel 56 to the assembly unit 32, they are retained in proper position upon the feed bar by means of a horizontal cover plate 56 overlying said longitudinal channel, a portion of the bottom of which is formed by said feed bar. The body portions are moved along this channel due to reciprocation of said feed bar. The cover plate 55 (Figs. 3, 5 and 8) extends from a point in proximity to the lower end of the chute 36 to a point adjacent to the assembling unit 32. This plate is adjustably held in spaced relation to the bottom of the channel 56 by means of a vertical suspension bar 57 (Fig. 8) and an adjustable set screw 58. The suspension bar 57 and said plate are connected together by means of a horizontal hinge pin 59 which permits manual elevation of the plate to facilitate inspection of the feed mechanism between the chute and assembling unit and the removal of container bodies that may have become jammed or in some other fashion interfered with normal operation of the machine.

Inasmuch as reciprocation of the feed bar 37 and engagement of the pusher fingers 49 with the container bodies function to advance the open topped body portions to the assembling station, it is obvious that during the return or rearward stroke of the bar, these pusher fingers would have a tendency to move the body portions backward toward the discharge end of the chute 36. For the purpose of preventing such backward motion of these container parts, a gravity actuated latch 60 (Figs. 5 and 8) is pivoted to a horizontal hinge pin 61 within a longitudinal channel 62 formed in the lower side of the aforementioned cover plate 55. This latch extends forwardly from the hinge pin with respect to the direction of movement of the body portions 34 and has its free end formed with a vertical abutment 63 or finger, shaped for automatic engagement with and removal from the interior of the container bodies. These latches effectively secure the container bodies against rearward movement but do not in the least interfere with forward travel thereof with and under the influence of the pusher fingers 49 and feed bar.

Reciprocation of the feed bar 37 is obtained by means including a pitman 64 (Figs. 2, 3, 5, 8 and 10), said pitman being connected to a slide 64ᵃ carried by the bar and at its outer end being connected to a rotary disk 65 which is mounted upon the upper end of a vertical shaft 66, the latter being journalled in a pair of vertically spaced bearings 67 at one end of the table 30. A pair of meshing bevel gears 68 provides driving connection between said shaft 66 and a short horizontal shaft 69, the latter being connected by gears 70 to a countershaft 71 which extends beyond the opposite end of said table 30 where it is operatively connected by means of a train of gears 72 to a motor driven shaft 73. This last named shaft 73 has driving connection with an electrical motor 74 or like source of power.

Figure 9:
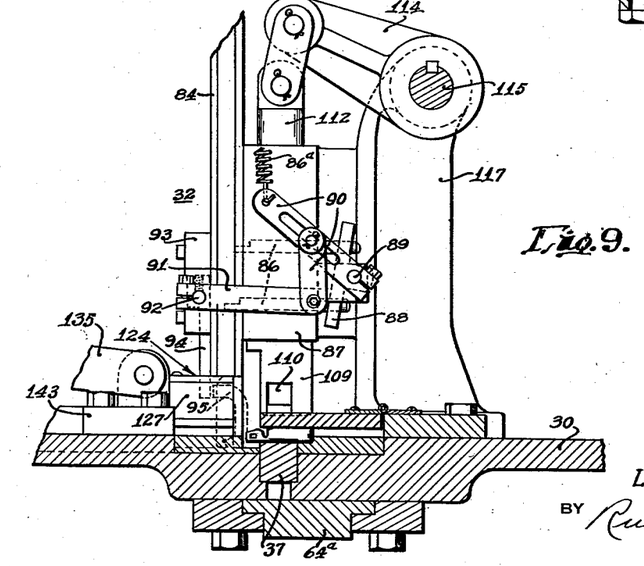
Fig. 9 is an end elevational view with parts in section looking toward the lefthand end of Fig. 8.
Figures 10, 11, 12, 13:
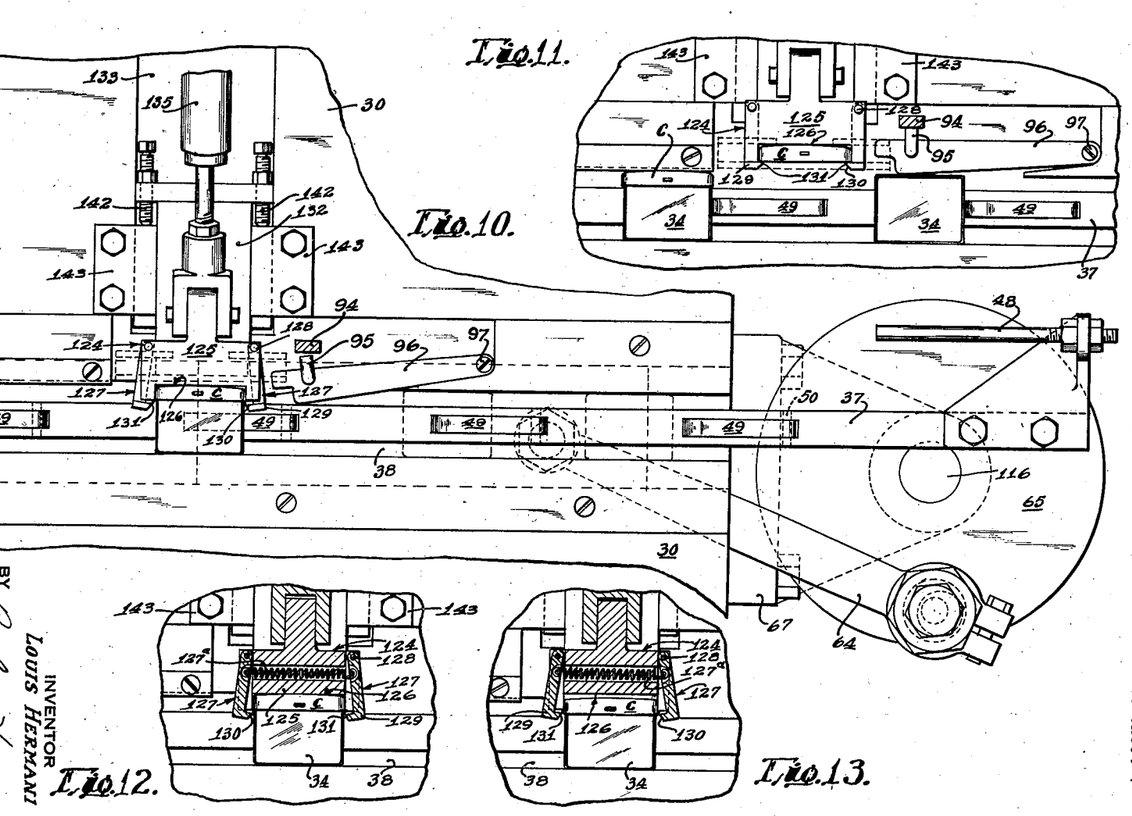
Fig. 10 is a fragmentary plan view of the body part feeding mechanism and a portion of the assembly mechanism.
Fig. 11 is a fragmentary plan view showing a cover part being held in position pending arrival of a bottom or body part at the assembly station.
Figs. 12 and 13 are fragmentary sectional plan views showing successive steps in the assembly of the body and cover parts.
Figure 14:
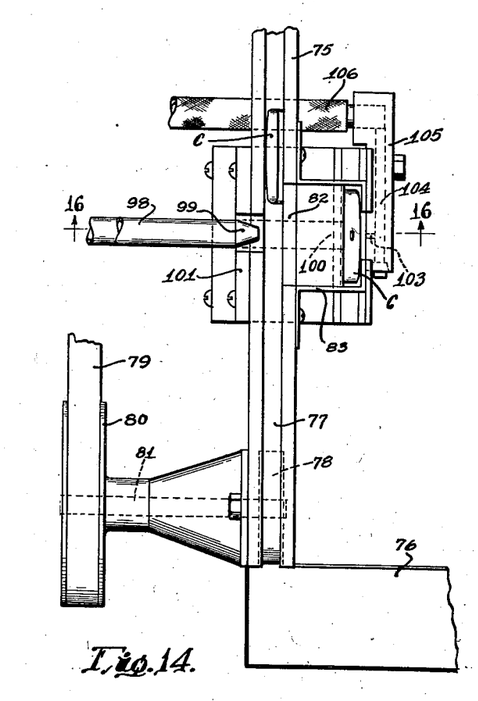
Fig. 14 is a fragmentary plan view of the delivery end of the conveyor and vertical guide for the cover parts.
Figure 15:
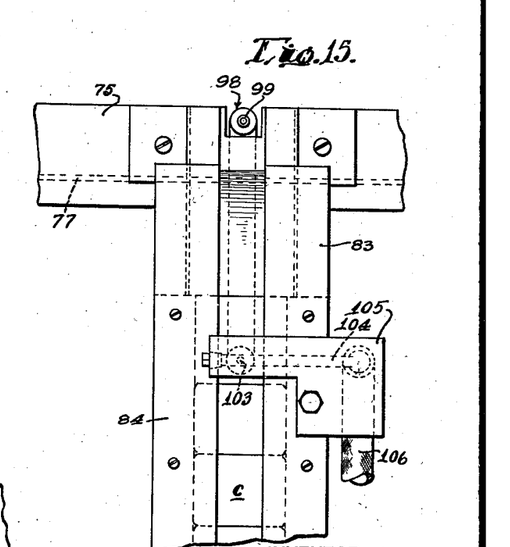
Fig. 15 is a fragmentary side elevational view showing the vertical guideway for the cover parts and the means for discharging such parts from the conveyor into the upper end of said guide.
Figure 16:
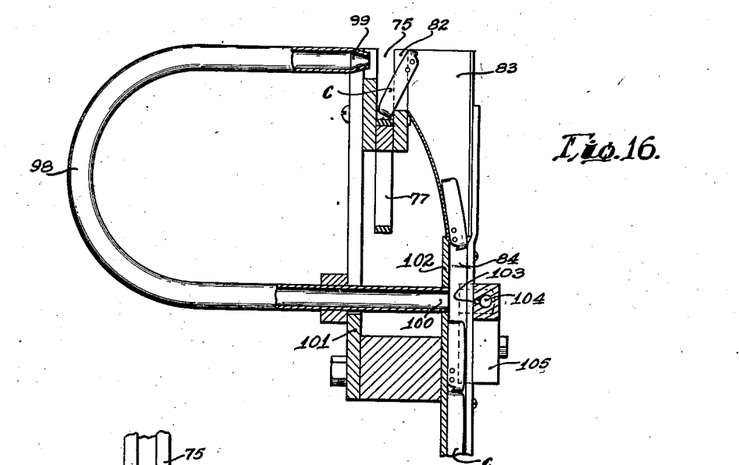
Fig. 16 is a sectional elevational view taken substantially along the line 16—16 of Fig. 14.
Figure 17:
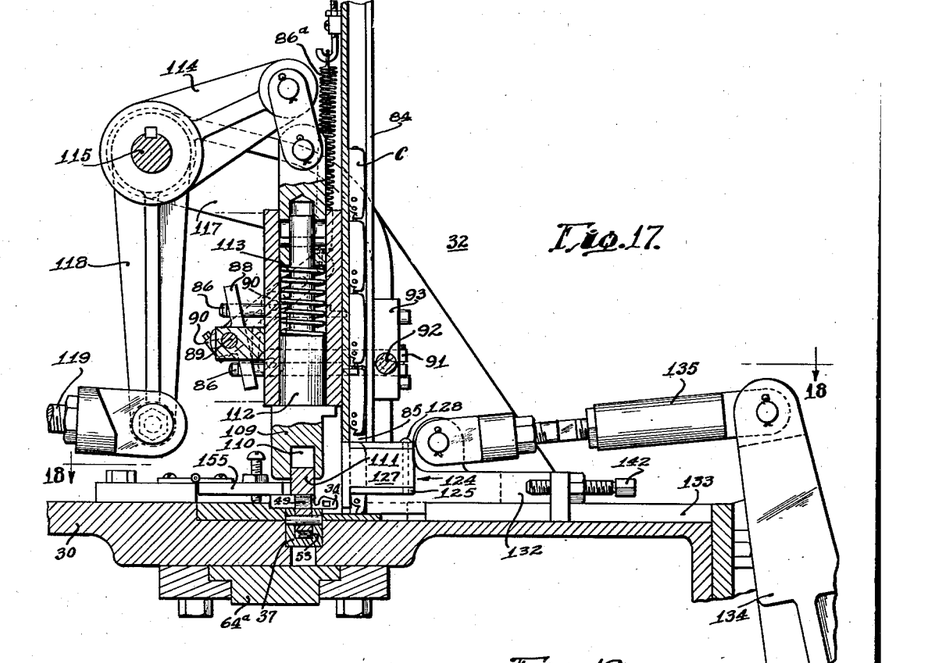
Fig. 17 is a vertical sectional view with parts in elevation of the body and cover assembly mechanism.
Figure 18:
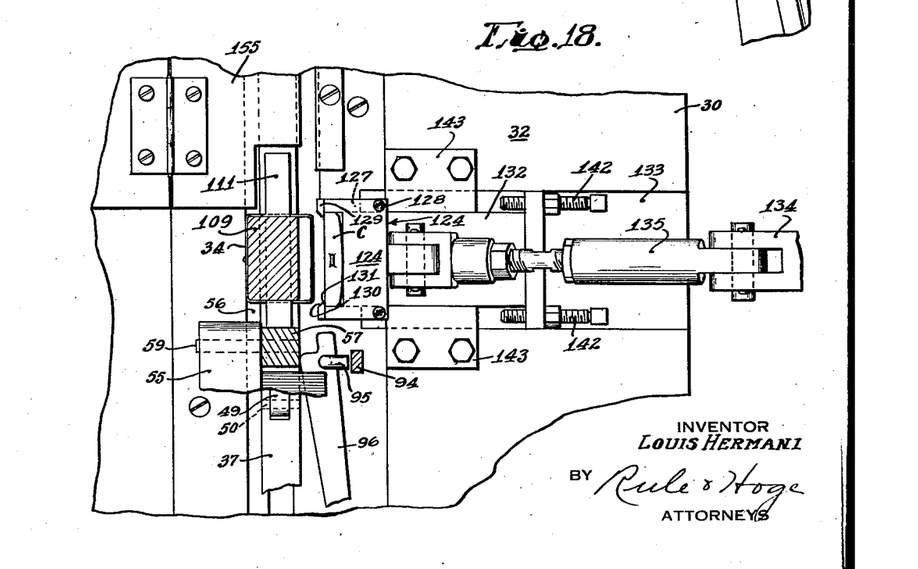
Fig. 18 is a sectional plan view taken substantially along the line 18—18 of Fig. 17.
Figures 19, 21:
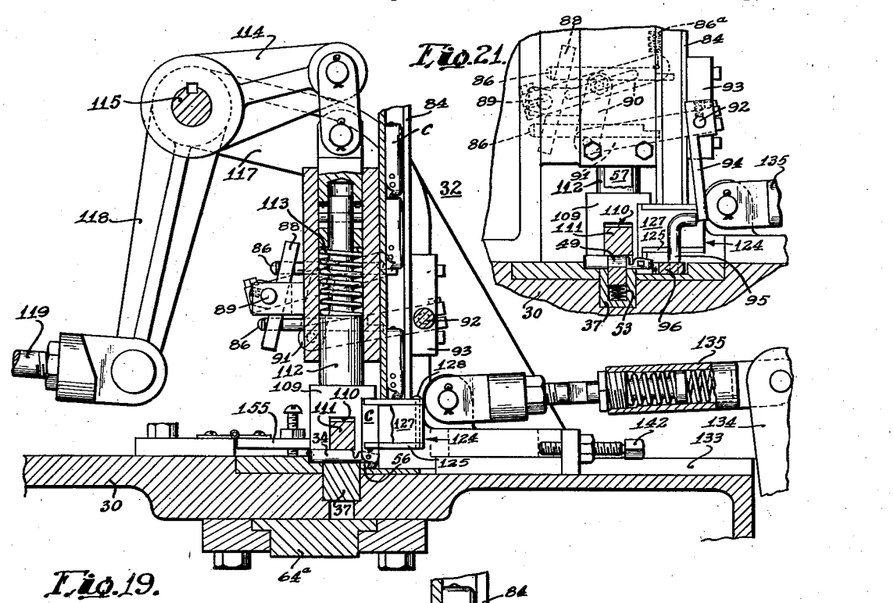
Fig. 19 is a view similar to Fig. 17, but shows the parts in their final assembling positions.
Fig. 21 is a sectional elevational view taken substantially along the line 21—21 of Fig. 3.
Figure 20:
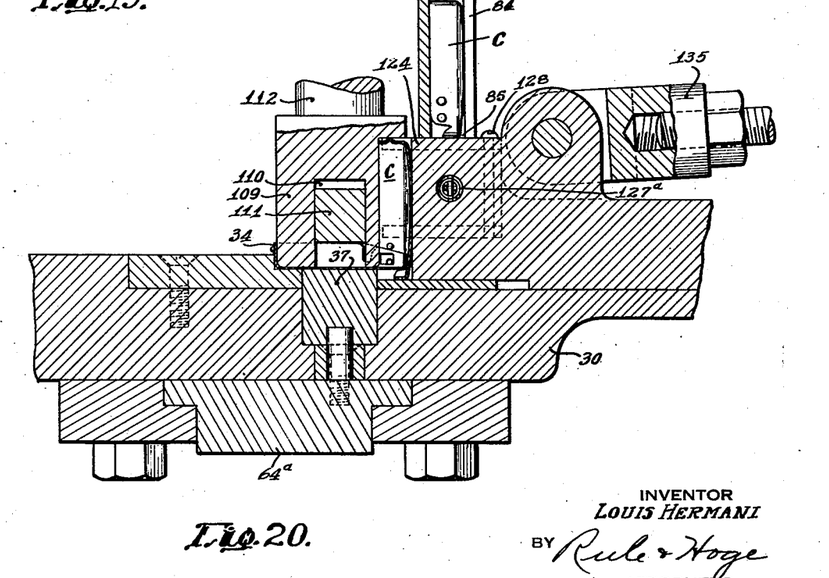
Fig. 20 is a fragmentary detail sectional view illustrating the final assembling positions of the parts.

The container bodies are momentarily brought to a standstill at the assembly station and while so positioned have the hinge end thereof telescoped into a cover C, which has previously been positioned at one side of the assembly station by automatic mechanism. This mechanism (Figs. 1, 2, 4 and 14 to 21) includes a horizontal guideway 75 which extends from a point in proximity to the cover punch press 29 to an inclined chute 76 which is positioned between the assembling unit 32 and the aforementioned inclined chute 36 which delivers the container bodies 34 to the feed bar 37. The covers C are conveyed on edge along said channel 75 or guideway by means of an endless belt 77 which is trained over a pulley 78 near the aforementioned inclined chute 76, said pulley being driven by means of a belt 79 and a second pulley 80, the latter mounted upon the outer end of a shaft 81 which also carries the first mentioned pulleys 78. Near one end of the channel a side wall thereof is in part cut away to provide a lateral discharge opening 82 which communicates directly with the open upper end of a substantially rectangular funnel guide 83, the latter being directly connected with the upper end of a vertical guideway or passageway 84. This vertical guideway in cross-section and dimensions is such as to accommodate a stack of the container covers placed on edge and in abutting relationship. The bottom end 85 of the passageway is open whereby to permit gravity discharge and positioning of the covers preparatory to moving them one at a time into assembled relationship with the container body portions. The container covers C are released from the bottom of the stack in the guideway one at a time by mechanism (Figs. 2, 4, 17, 19 and 21) including superposed pairs of horizontal stop pins 86 which are projected one pair at a time into the guideway in such fashion that the lower pair, during one stage of the operations, supports the complete stack whereas during a succeeding stage, the uppermost pair of pins supports the entire stack with the exception of the cover which previously was engaged by the lower pair of pins while the latter were functioning as the stack supporting medium. During this second stage the lower pins occupy a retracted position as shown in Fig. 19. A spring 86ᵃ (Fig. 9) normally holds the lower pair of pins projected into the passageway 84. These pins are mounted in a guide block 87 and are operatively connected by means of a pivoted cross-head 88 to a short horizontal shaft 89, the latter in turn being connected through links 90 to a lever 91 which in turn is mounted upon a rock shaft 92. This rock shaft 92 is journaled in a pair of horizontal bearings 93 and at the end opposite said lever 91, carries a depending finger 94 (Figs. 3, 4, 10, 11 and 19). This finger 94 or trigger is adapted to be rocked each time a container body moves to the assembly station whereby to insure the positioning of a cover at one side of the assembly station only in the event a container body has likewise been placed in position for assembly at said station. The finger or trigger 94 (Figs. 10, 11 and 18) is actuated by a pin 95 arising from a horizontal arm 96 which is pivoted upon a vertical hinge pin 97 at the end opposite the first named pin. The free end portion of this arm 96 normally projects into the channel 56 through a space which has been provided by cutting away a portion of the side wall of said channel 56. Thus the container bodies, as they are moved along the channel by means of the feed bar 37, engage the arm 96 and move it outwardly in such fashion as to interengage said pin 95 and the finger or trigger 94 and move the latter outwardly. As a result, the mechanism for supporting the stack of covers is actuated to release the single cover from the bottom of the stack simultaneously with movement of a container body to the assembly station.

The covers are discharged through the opening 82 into the funnel guide 83 (Figs. 2, 4 and 14 through 16) by a stream of air under pressure which is directed transversely across the upper portion of the channel in such fashion as to invert the covers simultaneously with discharge thereof into said funnel guide. Thus the covers are properly positioned for movement later on into assembled relationship with the container bodies. This discharge device also includes means whereby feeding of the container covers to the funnel guide will be momentarily discontinued whenever a stack in the guideway 84 reaches a predetermined level. Under such circumstances the covers move to the open outer end of the channel 75 where they are automatically discharged into the inclined chute 76 and thereby directed into any suitable receptacle. The specific construction consists of an air conduit 98 (Fig. 16), the outlet or nozzle end 99 of which opens into the upper portion of the channel 75 directly opposite the side discharge opening 82 in the channel 75. The inlet end 100 of the conduit, which is mounted in a bracket 101, opens into the guideway 84 through the inner wall 102 thereof. Directly across from and coaxial with the inlet end 100 of the conduit is a port 103 which communicates by way of a passageway 104 in a block 105 with an air supply pipe 106, the latter (Fig. 2) being connected to a main supply line 107 through a valve 108. It will be apparent from the above that the accumulation of a predetermined number of covers C in the passageway will automatically interrupt the flow of air into the inlet end 100 of the conduit 98 and thereby cause a momentary cessation of the discharge of covers into the funnel guide 83. Flow of air is resumed incident to dropping of the stack below the inlet 100.

The assembling unit 32 (Figs. 3, 4, 8 and 17 to 20) which interengages the hinge portions of the bodies and covers of the containers effects such assembly while the latter are momentarily held stationary. The assembly mechanism includes a presser foot 109 which has a horizontal slot 110 in the lower side thereof to accommodate a guide bar 111, the latter in part providing an upper wall for the channel 56 along which the container bodies are carried by the feed bar 37. This presser foot during the actual assembling operation is yieldingly forced into the body 34 in firm engagement with the bottom of the latter. Thus the container body is rigidly supported during the short period of time required to move a cover C into engagement therewith. The guide bar 111 is carried by the aforementioned suspension rod 57 which is yieldingly supported in a vertical guideway 111ª. A set screw 57ª and spring 57ᵇ provide connection between the rod and guideway. The presser foot (Figs. 4, 17, 19 and 20) is attached to the lower end of a guide rod 112 which is yieldingly connected through means including a coil spring 113 to a lever 114. This lever is mounted upon a horizontal rock shaft 115 which is journaled in a pair of longitudinally spaced bearings 116 on the upper side of the table 30. Brackets 117 carry said pair of bearings 116. A lever 118 which is secured to the rock shaft 115 in proximity to the first named lever 114, is adjustably connected by a rod 119 or link to a bell crank lever 120, the latter being mounted for oscillation upon a horizontal supporting rod 121 and having one end provided with a cam roller 122 which runs in a continuously rotating cam 123. This cam 123 is carried by the aforementioned counter-shaft 71 which receives its power from the electric motor 74. Thus, it is apparent by reference to Figs. 4, 17 and 19 that rotation of the cam 123 operates through the levers described to project the presser foot into successive container bodies as they are brought to the assembling station.

Movement of the covers one at a time from a position immediately below the discharge opening 85 of the vertical guideway 84 to a position in which the hinge portion thereof engages a corresponding portion on the bodies, may well be effected by the mechanism clearly shown in Figs. 4, 10 to 13, and 17 to 21. This mechanism includes a cover holder 124 which is mounted for horizontal reciprocation between a position in which it receives covers one at a time from the guideway 84 to a position in which the hinge portions of the cover and body are interengaged. This cover holder comprises a rectangular block 125 having a recess 126 in its forward face to accommodate a container cover in an "on-edge" position. A pair of jaws 127 which are arranged at the opposite vertical ends of said block and yieldingly held in engagement with the latter by a coil spring 127ª and mounted upon vertical hinge pins 128 operate to retain a cover part in said recess 126 during the advancing movement of the holder. The free forward end of the jaws 127 are formed with inwardly projecting fingers 129 which are intended to engage a portion of the cover in said recess 126. The extreme outer end 130 of each finger 129 is tapered for engagement with the end walls of the container body during the final stage of the advancing travel of said cover holder for the purpose of spreading the jaws apart and releasing the cover simultaneously with attachment thereof to the body portion. The rounded inner ends 131 (Figs. 10, 12 and 13) facilitate retraction of the holder 124 from engagement with the assembled container by sliding freely over the corresponding end wall of the cover. In its retracted position (Fig. 17) it will be observed that the recess 126 in the holder is vertically aligned with the discharge opening 85 of the guideway 84 so that the covers C move by gravity into said holder with the hinge end downward.

The cover holder 124 is attached to the forward end of a horizontal slide 132 which is mounted in a slideway 133 extending transverse to the length of the upper side of the table 30, said slide being connected to a bell crank lever 134 by means of a yielding connecting rod 135. This bell crank lever carries a cam roller 136 which rides upon a rotary cam 137, the latter being mounted upon and rotating with the aforementioned counter-shaft 71. This cam is so shaped that it rocks the lever 134 in a fashion to reciprocate the cover holder 124 in proper timed relation to the delivery of the cover and body parts to the assembly station and vertical reciprocation of the presser foot 109. The bell crank lever 134 is mounted upon a horizontal rod 138 extending longitudinally along one side of the table 30 and supported at its ends in brackets 139. The arc through which the upper arm of the bell crank lever 134 may swing, is regulably controlled by means of an adjustable stop screw 140 carried by a U-shaped frame 141 through which said arm extends and a pair of adjustable stop screws 142 which are carried by the slide 132 and engageable with plates 143 which are attached to the upper side of the table 30 inwardly from the margin thereof. The latter stop screws 142 limit the extent of forward motion of the cover holder while the first named stop screw 140 is utilized in effecting accurate alignment of the cover holder with the discharge opening of the vertical guide 84.

Figure 22:
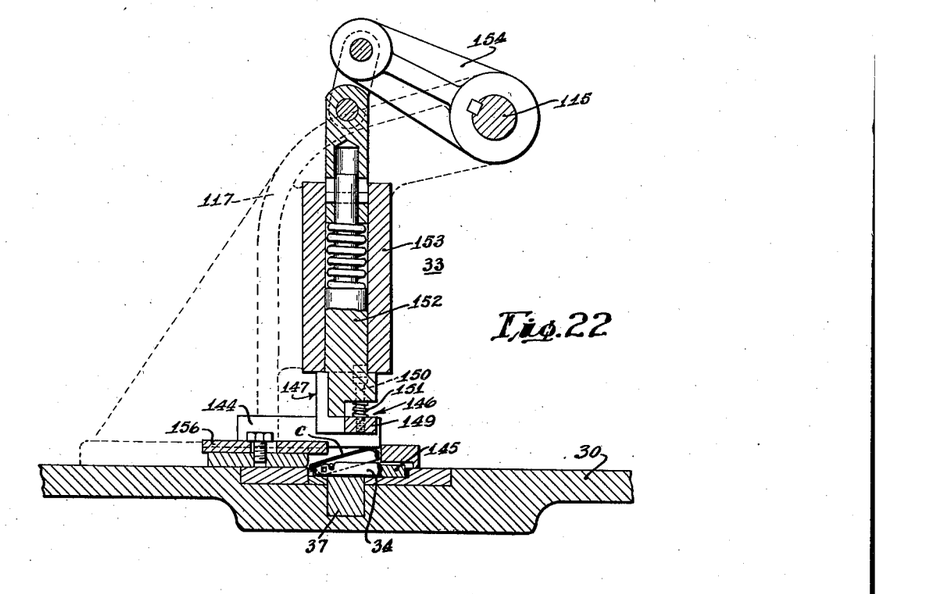
Fig. 22 is a sectional view taken substantially along the line 22—22 of Fig. 3.
Figure 23:
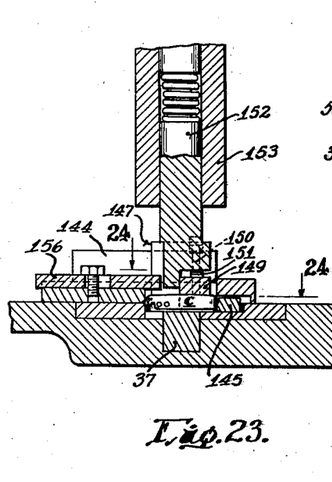
Fig. 23 is a sectional view similar to Fig. 22 showing the container closing mechanism in its final closing position.
Figure 24:
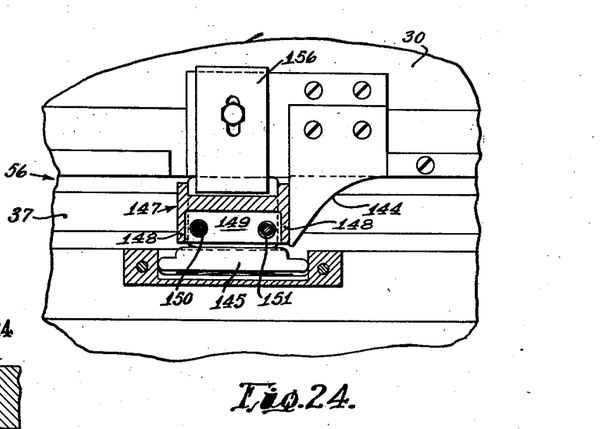
Fig. 24 is a sectional plan view taken substantially along the line 24—24 of Fig. 23.

Immediately upon completion of the assembling operation, the feed bar 37 moves the assembled body and cover with the latter still standing substantially vertically in a step-by-step fashion to a cam 144 (Figs. 3 and 24) which projects into the path of movement of the cover portions and overlies the normal path of the body portion. Thus the covers are partly closed. Immediately following such partial closing of the containers, they enter the "sizing" die 33 which functions to complete the closing operation and impart a predetermined standard of dimensions and contour to the side walls of the container. This die includes, in addition to a die block 145, which firmly, yet yieldingly, contacts the front wall of the closed container, a two-piece die block 146 which is mounted above the channel 56 for vertical reciprocation into and out of contact with the successive containers. This two-part die block includes a flanged section 147, the end flanges 148 of which are intended to snugly engage the vertical end walls of the closed container and impart to the latter the desired final shape in the event they have not already been properly shaped in the preceding forming operations. An ejector block 149 (Figs. 22 and 23) is slidingly and yieldingly fitted into a recess in the flanged section 147, such yielding connection being obtained by a pair of vertical guide pins 150 and coil springs 151 which encircle the pins between the ejector block and the flanged section 147. It will be noted that the ejector block 149 normally occupies a position slightly below the die proper in consequence of which it performs the additional function of completely closing the cover C of the container in advance of the final sizing operation. A vertical guide rod 152 carries the sectional die block 146 and is mounted for reciprocation in a stationary vertical guide 153. This rod 152 is yieldingly connected to a lever 154 which in turn is secured to the rock shaft 115.

In order to retain the containers in proper engagement with the feed bar 37 during their travel from the assembling station to the discharge end of the table 30, hinged cover plates 155 are positioned to at least in part overlie the feed bar 37 and partially close the upper side of the channel 56 along which the containers are conveyed. A cover plate 156 (Figs. 22, 23 and 24) is attached to the table 30 in such position that a portion thereof overlies the channel 56 at a point directly opposite the die block 145 which engages the forward wall of the closed containers.

In operation the covers C are fed into the vertical guideway 84 and arranged in a stack therein as previously described. The container bodies are delivered one at a time with the open side up, to the feed bar 37, which conveys them in a step by step fashion along the channel 56 to the assembling station. Since the movement of this feed bar is intermittent, the container bodies are held stationary momentarily at the assembling station, a sufficient period of time to permit attachment thereto of the container covers C. At a predetermined point in advance of the assembling station, the covers engage the arm 96 and move it outwardly for the purpose of actuating the mechanism which discharges the lowermost cover from the stack into the cover holder 124. Simultaneously with the delivery of a container body to the assembling station the presser foot 109 descends into firm engagement with the inner surface of the bottom thereof and the cover holder forces a cover into assembled relationship therewith. In the event the feed bar 37 advances without carrying a container body to the assembling station, the arm 96 obviously is not moved. Consequently the cover feeding mechanism will not be actuated and the empty cover holder 124 will move forwardly to the assembly position.

Following the assembling operation the containers are conveyed in a step by step fashion to the "sizing" die. Just prior to reaching this die the covers are partially closed. The die as stated heretofore completes the cover closing operation and squeezes the side walls to the dimensions and shape which have been adopted as standard. The completed containers are then delivered to a conveyor or otherwise carried to a packing station where they are placed in shipping cartons.

Modifications may be resorted to within the spirit and scope of the appended claims.

I claim:

1. Apparatus of the character described comprising, a vertical guideway at a body and cover assembling station having an open upper receiving end and a lateral discharge opening at its lower end, said last named opening being located substantially at the point of assembling the body and cover, means for delivering container covers to the upper end of said vertical guideway, mechanism for holding a stack of such container parts in the guideway and on edge above the discharge opening and releasing them one at a time for register with said opening, and mechanism for moving the container covers one at a time through said opening and solely by such movement finally assembling them with the bodies at said station.

2. In apparatus for assembling hinged container bodies and covers wherein the hinge consists of interengaged recesses and projections, means for bringing container bodies open-side up, to an assembling station and holding them stationary momentarily at the said station, a presser foot at said station, said foot shaped to momentarily lend internal support to a major portion of the bodies, means for bringing said foot into holding engagement with the inner surface of the container bodies at said station, a cover holder for bringing container covers into assembled relationship with the container bodies at said station, means for operating said cover holder, and mechanism for delivering container covers one at a time to said holder.

3. In apparatus of the character described, means for bringing relatively shallow container bodies open-side up to an assembling station one at a time and holding them stationary momentarily at the assembling station, a presser foot arranged above the bodies at said station and of such shape and size as to support a major part of the bodies when inserted therein, means for lowering said foot into holding and supporting engagement with the container bodies one at a time at said station, and means for delivering container covers in an on-edge position into assembled relationship with one margin of the container bodies at said station.

4. In apparatus of the character described, means by which container bodies are moved in succession and in a step-by-step fashion to an assembling station, means for holding the bodies stationary at the assembling station, a cover holder, means for delivering container covers to the holder one at a time and means for moving said holder horizontally in a direction transverse to the path of movement of the container bodies for assembling the container bodies and covers, said cover holder including a recessed block, a pair of jaws pivoted to the block and having inwardly directed fingers at their free ends, spring means yieldingly holding the jaws in their innermost position with the fingers extending partly across the open side of the recess whereby to secure a cover on edge in the latter, and said fingers having tapered faces for engagement with the container bodies and covers during the assembly operation and retraction of the cover holder.

5. In apparatus of the character described, a vertical guideway having open upper and lower ends, mechanism including vertically spaced pins projectable into the guideway for controlling gravity discharge of the parts through the open lower end of the guideway and effecting discharge thereof one at a time, a conveyor for bringing other parts to an assembly station in proximity to the lower end of said guideway, means for moving the parts discharged from the vertical guideway into assembled relationship with the other parts at said station, and means whereby movement of the parts by said conveyor past a predetermined point effects operation of the first named mechanism.

6. In apparatus of the character described, means including a horizontally reciprocable feed bar for bringing container bodies open side up to an assembling station, a guideway along which the feed bar advances the bodies, a guide bar, a bifurcated presser foot straddling the guide bar at said station, mechanism for lowering said foot relative to the guide bar at regular intervals into holding engagement with a body at said station, and means for bringing a cover into assembled relationship with a body while the latter is being held by said presser foot.

7. In apparatus of the character described, means including a horizontally reciprocable feed bar for bringing container bodies open side up to an assembling station, a guideway along which the feed bar advances the bodies, a guide bar, a bifurcated presser foot straddling the guide bar at said station, mechanism for lowering said foot relative to the guide bar at regular intervals into holding engagement with a body at said station, a cover holder for supporting covers in an on-edge position, means for operating the holder whereby to bring a cover into assembled relationship with a body while the latter is being held by said presser foot.

8. In apparatus of the character described, means for bringing relatively shallow container bodies open-side up to an assembling station one at a time and holding them stationary momentarily at the assembling station, a presser foot arranged above the bodies at said station and of such shape and size as to support a major part of the bodies when inserted therein, means for lowering said foot into holding and supporting engagement with the container bodies one at a time at said station, means for delivering container covers in an on-edge position into assembled relationship with one margin of the container bodies at said station, and means whereby movement of the bodies past a preselected point in proximity to said station actuates the cover delivering means.

LOUIS HERMANI.